United States Patent [19]
van Driest

[11] Patent Number: 6,115,411

[45] Date of Patent: Sep. 5, 2000

[54] SYSTEM AND METHOD FOR SPREAD SPECTRUM CODE POSITION MODULATION AND WIRELESS LOCAL AREA NETWORK EMPLOYING THE SAME

[75] Inventor: Hans van Driest, Bilthoven, Netherlands

[73] Assignee: Lucent Technologies, Inc., Murray Hill, N.J.

[21] Appl. No.: 08/775,836

[22] Filed: Dec. 31, 1996

[51] Int. Cl.⁷ ................................................ H04B 15/00
[52] U.S. Cl. ......................... 375/200; 370/213; 332/112
[58] Field of Search ................................. 375/200, 202, 375/205, 206, 207, 225; 370/213; 332/112

[56] References Cited

U.S. PATENT DOCUMENTS

| | | | |
|---|---|---|---|
| 5,166,952 | 11/1992 | Omurg et al. | 375/200 |
| 5,466,757 | 11/1995 | Chang | 375/239 |
| 5,596,601 | 1/1997 | Bar-David | 375/207 |
| 5,623,511 | 4/1997 | Bar-David et al. | 375/207 |

*Primary Examiner*—Wellington Chin
*Assistant Examiner*—Conguan Tran

[57] ABSTRACT

A system for, and method of, generating a spread spectrum code position modulated waveform and a wireless local area network (LAN) containing the system or the method. The system includes: (1) a spread-spectrum encoder that receives and encodes portions of an information signal with a multi-chip code having a predetermined length to create therefrom a stream of sequences, each of the sequences having the predetermined length and (2) a transmitter that periodically transmits the each of the sequences at a time interval that differs from the predetermined length, a data rate of transmission of the information signal thereby allowed to increase.

17 Claims, 6 Drawing Sheets

SYSTEM AND METHOD FOR SPREAD SPECTRUM CODE POSITION MODULATION AND WIRELESS LOCAL AREA NETWORK EMPLOYING THE SAME

CROSS-REFERENCE TO RELATED APPLICATIONS

The present invention is related to those disclosed in U.S. patent application Ser. No. 08/298,260 of Bar-David, filed on Aug. 30, 1994, entitled "A Method and Apparatus for Spread Spectrum Code Pulse Position Modulation" (hereafter, the "Bar-David '260 reference") and U.S. patent application Ser. No. 08/345,110 of Bar-David, filed on Nov. 28, 1994, entitled "A Spread Spectrum Code Pulse Position Modulated Receiver having Delay Spread Compensation" (hereafter, the "Bar-David '110 reference"). Each reference is commonly assigned with the present invention and is hereby incorporated by reference for all purposes.

TECHNICAL FIELD OF THE INVENTION

The present invention is directed, in general, to spread spectrum code position modulation communications and, more specifically, to a method and apparatus for encoding and decoding a spread spectrum code position modulated signal transmitted over a dispersive transmission medium and a wireless local area network ("LAN") employing the same.

BACKGROUND OF THE INVENTION

Computer systems configured as local area networks have been common for nearly two decades and are popular in a wide variety of business and educational applications. The most common LANs comprise a number of processing devices and a server that are coupled together by a hard-wired connection. Since about 1990, however, wireless local area networks (LANs) have become more common in the marketplace. Although the concept behind wireless LANS had been described a decade earlier, interest in LAN networks was limited until the release of the 2.4 GHz unlicensed band for industrial, scientific and medical (ISM) applications. Wireless LAN products most often employ either direct sequence spread spectrum (DSSS) or frequency hopping spread spectrum (FHSS) techniques to communicate between roaming mobile stations and network access points.

In a typical wireless computer network environment, the "backbone" of the LAN is a central server that communicates with a number of network access points through a hard-wired connection. Each access point (AP) includes a transceiver for communicating with at least one roaming mobile station (MS). The mobile station may be a point-of-sale terminal (i.e., an electronic cash register), a bar code reader or other scanner device, or a notepad, desktop or laptop computer. Each MS establishes a communication link with an AP by scanning the ISM band to find an available AP. Once a reliable link is established, the MS interacts with other mobile stations and/or the server. This allows the user of the MS to move freely in the office, factory, hospital or other facility where the wireless LAN is based, without being limited by the length of a hard-wired connection to the LAN.

Eventually, the mobile station will move out of the range of its current access point. When this occurs, a "handover" takes place that breaks down the communication link between the mobile station and the current access point and establishes a new communication link between the mobile station and a new access point. The mobile station initiates this process when it detects that the link quality with the current access point has degraded below a specified threshold. The mobile station then begins looking for another access point, probably in a different frequency channel.

As noted, wireless LAN products frequently employ some type of spread spectrum technique, such as direct sequence spread spectrum (DSSS) or frequency hopping spread spectrum (FHSS), to communicate between roaming mobile stations and network access points. A distinguishing feature of the spread spectrum technique is that the modulated output signals occupy a much greater transmission bandwidth than the baseband information bandwidth requires. The spreading is achieved by encoding each data bit in the baseband information using a codeword, or symbol, that has a much higher frequency than the baseband information bit rate. The resultant "spreading" of the signal across a wider frequency bandwidth results in comparatively lower power spectral density, so that other communication systems are less likely to suffer interference from the device that transmits the spread spectrum signal. It also makes the spread signal harder to detect and less susceptible to interference (i.e., harder to jam).

Both DSSS and FHSS techniques employ a pseudo-random (PN) codeword known to the transmitter and to the receiver to spread the data and to make it more difficult to detect by receivers lacking the codeword. The codeword consists of a sequence of "chips" having values of −1 or +1 (polar) or 0 and 1 (non-polar) that are multiplied by (or Exclusive-ORed with) the information bits to be transmitted. Accordingly, a logic "0" information bit may be encoded as a non-inverted codeword sequence, and a logic "1" information bit may be encoded as an inverted codeword sequence. Alternatively, a logic "0" information bit may be encoded as a first predetermined codeword sequence and a logic "1" information bit may be encoded as a second predetermined codeword sequence. There are numerous well known codes, including M-sequences, Gold codes and Kasami codes.

Many wireless networks conform to the IEEE 802.11 standard, which employs the well-know Barker code to encode and spread the data. The Barker codeword consists of eleven chips having the sequence "00011101101", or "+++−−−+−−+−". One entire Barker codeword sequence, or symbol, is transmitted in the time period occupied by a single binary information bit. Thus, if the symbol (or Barker sequence) rate is 1 MHZ, the underlying chip rate for the eleven chips in the sequence is 11 MHZ. By using the 11 MHZ chip rate signal to modulate the carrier wave, the spectrum occupied by the transmitted signal is eleven times greater. Accordingly, the recovered signal in the receiver, after demodulation and correlation, comprises a series of inverted Barker sequences representing, for example, logic "1" information bits, and non-inverted Barker sequences, representing for example, logic "0" information bits.

A key performance parameter of any communication system, particularly computer networks and cellular telephone systems, and the like, is the transfer rate of data between devices in the communication system. Wireless LANs are no exception. It is therefore important to maximize the rate at which data may be exchanged between access points and mobile stations in a wireless LAN in order to maximize the LAN performance.

Accordingly, there is a need in the art for systems and methods that increase the rate at which data may be transferred in a communication system using spread spectrum techniques to communicate data between a receiver and a transmitter. There is a still further need for systems and methods that increase the rate at which data may be transferred in a wireless LAN using spread spectrum techniques to communicate data between a network access point and a mobile station in the network.

SUMMARY OF THE INVENTION

To address the above-discussed deficiencies of the prior art, the present invention provides a system for, and method of, generating a spread spectrum code position modulated waveform and a wireless local area network (LAN) containing the system or the method. The system includes: (1) a spread-spectrum encoder that receives and encodes portions of an information signal with a multi-chip code having a predetermined length to create therefrom a stream of sequences, each of the sequences having the predetermined length and (2) a transmitter that periodically transmits the each of the sequences at a time interval that differs from the predetermined length, a data rate of transmission of the information signal thereby allowed to increase.

The present invention therefore introduces the broad concept of allowing the time interval to differ from the sequence length. The present invention is the first to recognize that the time interval need not equal the sequence length. This supposed dependence has always been assumed in the prior art. By freeing the time interval from such constraint, the data rate can be preferably allowed to increase without increasing the bandwidth of the resulting spread spectrum code position modulated waveform.

In one embodiment of the present invention, the time interval is less than the predetermined length, a data rate of transmission of the information signal thereby increasing. Alternatively, the time interval may be allowed to exceed the predetermined length. This may be advantageous when other data encoding techniques are employed.

In one embodiment of the present invention, the information signal is digital, the portions corresponding to individual bits of the information signal. Alternatively, the portions may be samples of an analog information signal.

In one embodiment of the present invention, the multi-chip code is a Barker code. Those skilled in the art are familiar with Barker codes. Other advantageous codes for encoding the portions will be set forth in greater detail below.

In one embodiment of the present invention, the predetermined length is less than 20 chips. In the embodiment to be illustrated and described, the predetermined length is 11 chips. However, those skilled in the art should understand that the present invention is not limited to a particular predetermined length.

In one embodiment of the present invention, the stream of sequences is processed to create main lobes therein, the time interval being one chip greater than an allowable range of chip offsets applied to the main lobes. In the embodiment to be illustrated and described, the main lobes of the stream of sequences are offset up to 8 chips. The present invention, in the above-described embodiment, allows a guard interval to remain between symbols in order to minimize the effects of intersymbol interference.

In one embodiment of the present invention, the time interval is 9 chips. Of course, the time interval can be any desired length other than the predetermined length of the multi-chip code.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
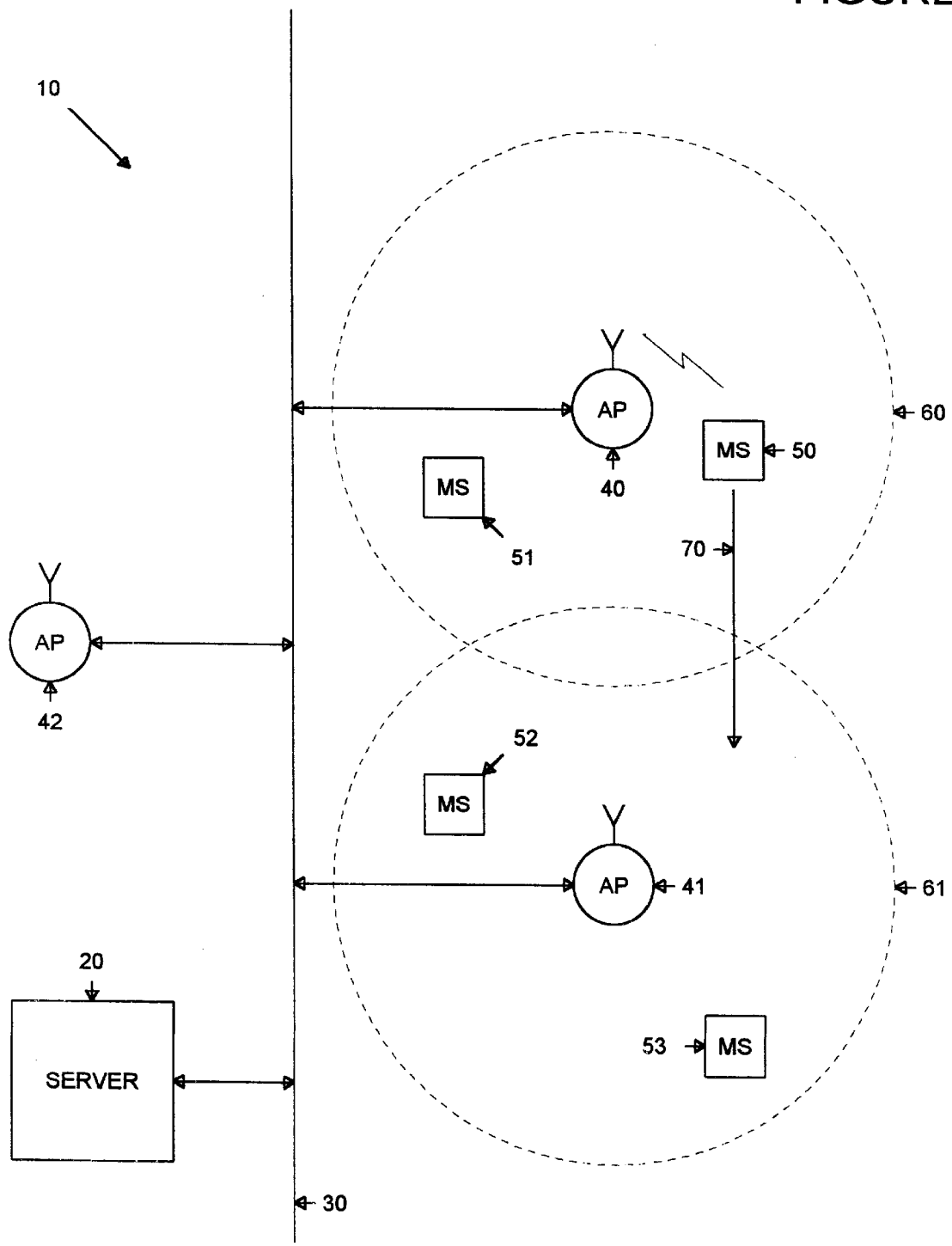
FIG. 1 illustrates a topological diagram of a wireless computer network.

Referring initially to FIG. 1, illustrated is the topology of wireless computer network 10. Server 20 of wireless network 10 communicates bi-directionally with access points 40–42 via bus 30, which is typically a hard-wired connection. In other embodiments, server 20 may communicate with one or more of access points 40–42 by wireless link. AP 40–42 also communicate with one or more mobile stations (MS) 50–53 by wireless link. Each access point can transmit data to and receive data from mobile stations that are within the specified broadcast range of the access point. For example, AP 40 and AP 41 have broadcast ranges 60 and 61, respectively. AP 40 can communicate with MS 50 and MS 51 and AP 41 can communicate with MS 52 and MS 53.

Although the exemplary broadcast coverage areas of AP 40 and AP 41 are circular in shape, it is possible for the broadcast area of an access point to assume other shapes, including hexagonal. The shape and size of the coverage area of an access point is frequently determined by obstructions that prevent the transmission of signals between the access point and a mobile station.

Following the release of the ISM bands, wireless computer networks have been implemented in a wide variety of systems. For example, network 10 may be a wireless LAN in an office building. Mobile stations 50–53 would typically be desktop and/or notebook computers that communicate with a document server, such as server 20, or run payroll or spreadsheet applications in connection with a server. Alternatively, network 10 may be a wireless LAN used to run the operations of a warehouse facility or manufacturing plant. Employees roaming the warehouse or factory floor, or even moving outside the facility, could communicate with a central server using a wide variety of mobile stations. For example, employees could use bar code scanners to send and receive data to/from server 20 through AP 40–42. Still other employees may roam a facility using notepad devices to update inventory in server 20. In still other embodiments, network 10 may a wireless LAN in a large department store and mobile stations 50–54 could be electronic cash registers and/or bar code readers.

As mobile stations 50–53 move about in the wireless LAN environment, the mobile stations will enter and leave the coverage areas of different access points. For example, as MS 50 moves in the direction of path 70, MS 50 moves away from its current access point, AP 40, to a new access point, AP 41. At some point in its movement along path 70, MS 50 determines that the signal quality of the link with current AP 40 has degraded below (or at least close to) an acceptable threshold level. When this occurs, MS 50 begins scanning for another AP in order to set up a "handover".

As noted above, spread spectrum techniques are frequently employed in wireless LANs. Accordingly, in one embodiment of the present invention, the access points, AP 40–42, and mobile stations, MS 50–53, of network 10 incorporate transmitters and receivers that employ spread spectrum techniques to transfer data. For the purpose of simplifying the description of the improved spread spectrum receivers and transmitters that follows, it will be assumed that the receivers and transmitters communicate according to the IEEE 802.11 standard. However, it should be understood that this assumption is by way of illustration and is in no way limiting to the scope of the claims of the present invention. In particular, it should be understood that the improved systems and methods hereinafter described for increasing the data transmission rate in a spread spectrum system may readily be employed in wireless computer networks conforming to other standards, and even to communication systems other than computer networks, such as cellular telephone systems and the like.

Figure 2:
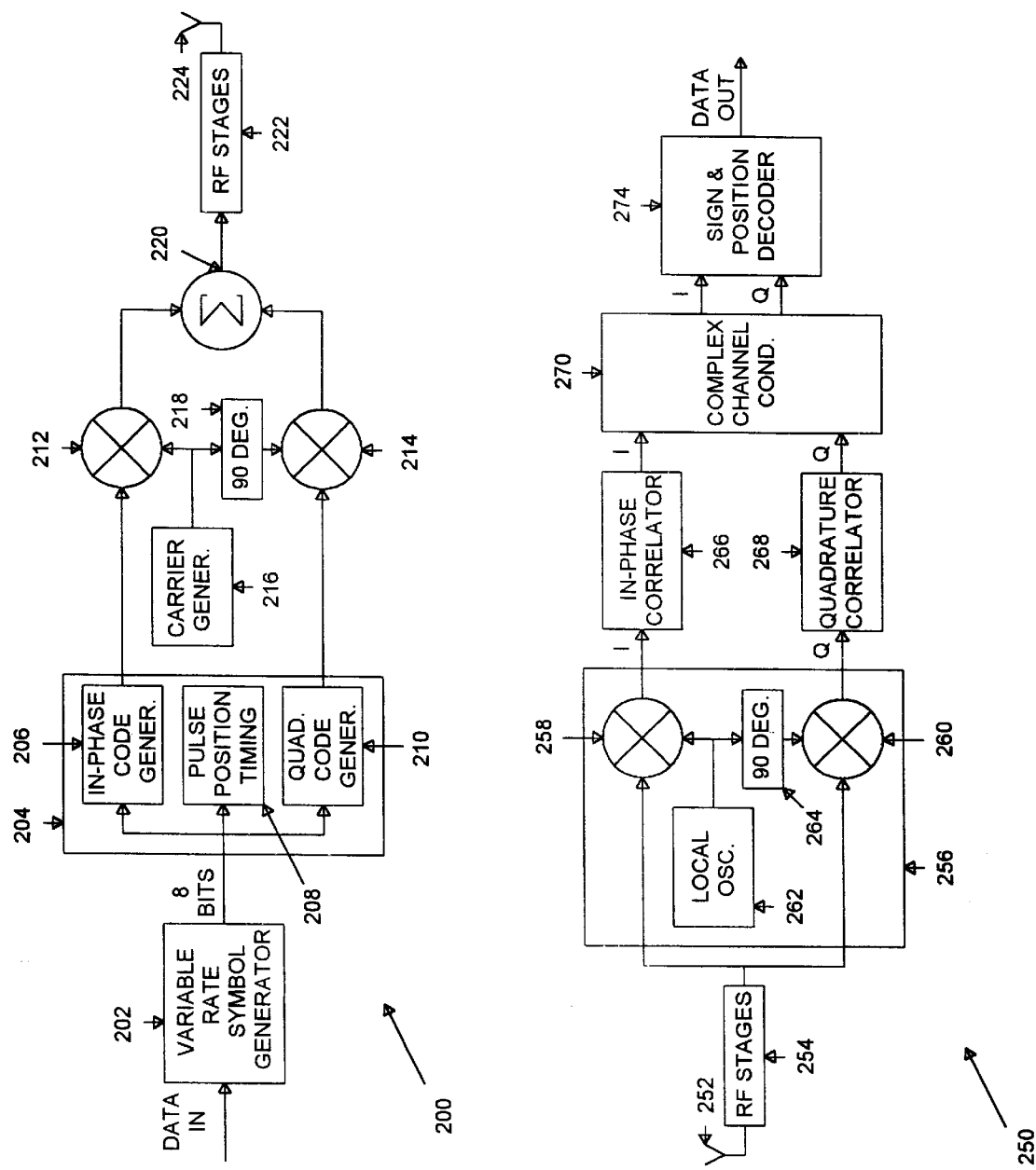
FIG. 2 illustrates a transmitter and receiver in accordance with one embodiment of the present invention.

FIG. 2 illustrates transmitter 200 and receiver 250 in accordance with one embodiment of the present invention. Transmitter 200 and receiver 250 may be incorporated in mobile stations and access points of network 10. In the exemplary embodiment, transmitter 200 and receiver 250 transmit and receive a binary logic "0" using a non-inverted 11-chip Barker sequence and transmit and receive a binary logic "1" using an inverted 11-chip Barker sequence. The bit rate of the baseband information is nominally 1 MHZ, so that the transmitted chip rate is 11 MHZ. However, as will be explained below, the present invention employs quadrature phase-shift keying (QPSK) of an in-phase cosinusoidal carrier (I channel signal) and a quadrature sinusoidal carrier (Q channel signal) to further increase the information bit transmission rate.

The present invention also employs code position modulation to further increase the information bit transmission rate, whereby the transmission of the I channel signal and the Q channel signal are delayed or advanced through, for example, a range of eight timing positions. The values of the eight timing positions correspond to the eight binary values 000–111, thereby adding an additional three bits to both the I channel signal and the Q channel signal.

Finally, the present invention increases the transmission rate of the information bits by increasing the symbol transmission rate without changing the chip sequence rate, or the length of the 11-chip Barker sequences. This is achieved by "overlapping" at least portions of consecutive 11-chip Barker sequences in both the I channel and the Q channel, as will be explained below in greater detail.

The data to be tranmitted are read by variable-rate symbol generator 202 in transmitter 200. According to the IEEE 802.11 DS standard, transmitter 200 transmits a 192 bit (192 symbol) preamble pattern, the first 128 symbols of which are used for synchronization of receiver 250. The preamble, including the 128 symbol synchronization field, is transmitted at a 1 MHz symbol rate in differential binary phase-shift keying (DBPSK) modulation in which the I channel and the Q channel contain the same information. Receiver 250 detects the synchronization symbols and synchronizes its internal clocks to the synchronization symbols in order to establish a fixed reference time frame with which to interpret the data field which follows the preamble. In this example, the fixed reference time frame consists of successive contiguous one microsecond time frames synchronized to the time frames during which 11-chip Barker sequences are transmitted.

The synchronization field and preamble are transmitted at the start of every message. The DATA field within each transmitted message is kept relatively short (up to about 1500 bytes, for example) for a number of reasons. Many wireless protocols, including the IEEE 802.11 DS standard, require re-transmission of an entire frame (preamble plus DATA field) if an error is detected. Re-transmission of an extremely long frame would be wasteful of bandwidth. Furthermore, it is necessary to share the available bandwidth with other users on the network, but an extremely long frame will effectively slow down the data transfer rates of other users. Finally, channel conditions frequently change over time, but, in some modes (such as code position modulation), the channel conditions are only estimated during transmission of the preamble. If an overly long period occurs between preambles, changed channel conditions may lead to increased error rates. For these reasons, it may be necessary to divide a large block of information over many messages in order to complete transmission.

When the preamble is complete and transmitter 200 and receiver 250 are synchronized, variable rate symbol generator 202 sends varying numbers of data bits to encoder 204 during transmission of the DATA field, depending on the mode of operation. Variable rate symbol generator 202 may cause receiver 200 to transmit two (2) information bits per symbol period during transmission of the DATA field by simultaneously transmitting a first information bit as a Barker sequence in the I channel signal and a second information bit as a Barker sequence in the Q channel using DQPSK( techniques. Variable rate symbol generator 202 may cause receiver 200 to transmit an additional three (3) information bits per symbol by delaying or advancing the I channel Barker sequence through one of eight timing positions in the fixed reference time frame (i.e., code position modulation). Finally, variable rate symbol generator 202 may cause receiver 200 to transmit a further three (3) information bits per symbol by delaying or advancing the Q channel Barker sequence through one or eight timing positions in the fixed reference time frame. This yields a total of eight bits that may be transmitted per one microsecond time frame, for an 8 MHZ data transfer rate.

In one embodiment of the present invention, variable rate symbol generator 202 sends eight information bits to encoder 204. A first bit is read by in-phase code generator 206, which generates a non-inverted Barker sequence or an inverted Barker sequence, depending on whether the first bit is a binary "1" or a binary "0". A second bit is read by quadrature code generator 210, which generates a non-inverted Barker sequence or an inverted Barker sequence, depending on whether the second bit is a binary "1" or a binary "0". The remaining six bits are read by pulse position timing circuit 208. Three of these bits advance or delay the I channel Barker sequence through one of eight time positions in the fixed reference time frame established by the synchronization field. The other three bits advance or delay the Q channel Barker sequence, accordingly.

The time-shifted I channel Barker sequence is sent to RF mixer 212 and the time-shifted Q channel Barker sequence is sent to RF mixer 214. Carrier generator 216 provides a cosinusoidal carrier frequency to RF mixer 212 and a sinusoidal carrier frequency through 90 degree shifter 218 to RF mixer 214. RF mixer 212 outputs the cosinusoidal carrier frequency modulated by the time-shifted I channel Barker sequence signal. RF mixer 212 outputs the sinusoidal carrier frequency modulated by the time-shifted Q channel Barker sequence signal. The modulated carriers are combined in adder 220 and then amplified in RF stages 222 before being transmitted through antenna 224.

The transmitted signal is picked up by antenna 252 of receiver 250 and sent through RF stages 254, which amplify the received signal and filter out unwanted frequencies in order to isolate the frequencies of interest (i.e, the desired 11 MHZ bandwidth). The filtered and amplified signal is sent to demodulator 256. Local oscillator 262 provides a cosinusoidal reference signal to RF mixer 258, which generates the time-shifted I channel Barker sequence at its output. Local oscillator 262 provides a sinusoidal reference signal through 90 degree shifter 264 to RF mixer 260, which generates the time-shifted Q channel Barker sequence at its output.

Next, the time-shifted I channel Barker sequence is sent to in-phase correlator 266, which is a filter matched to the known Barker sequence. As will be explained below in greater detail, in-phase correlator 266 produces a correlation function at its output that has a peak amplitude at its center lobe that is much greater (eleven times greater, for example) than its side lobes. Likewise, the time-shifted Q channel Barker sequence is sent to quadrature-phase correlator 268, which is a filter matched to the known Barker sequence. Quadrature-phase correlator 268 also produces a correlation function at its output that has a peak amplitude at its center lobe that is much greater (eleven times greater) than its side lobes. The sign of the center lobe of the correlation function (i.e., a positive or negative amplitude) is determined by whether an inverted or a non-inverted Barker sequence was received by the correlators.

As a result of multipath effects, delay spread frequently causes the main lobe and the side lobes of the Barker sequences to spread over into adjacent symbols in the same channel and even into symbols in the quadrature channel. Therefore, in a preferred embodiment, receiver 250 includes complex channel conditioner 270 which conditions the I channel and Q channel correlation functions to compensate in a known manner for the delay spread of the communication channels. For example, a complex channel conditioner similar to the one described in the Bar-David '110 reference, which was incorporated by reference above, may be used. The conditioned I channel and Q channel correlation functions are then analyzed by sign and position decoder 274, which uses the sign of the large center lobes of the correlation functions to determine whether an inverted or a non-inverted Barker sequence was received in each channel, thereby deriving two of the transmitted bits. Sign and position decoder 274 also uses the position of each correlation function within the fixed reference time frame to determine the three delay bits used to delay or advance the Barker sequence in each channel, thereby deriving the remaining six transmitted bits.

It is apparent that time shifting the Barker sequences causes consecutive Barker sequences to overlap in each channel. Without code position modulation, each Barker sequence begins as the previous sequence ends. However, if a first Barker sequence is delayed and the following Barker sequence remains fixed or even advances, the periods of each Barker sequence will overlap, resulting in simultaneous transmission of at least portions of each. This is a form of interference and results in correlation functions that partially overlap in the side lobes. However, the amplitudes of the side lobes of the correlation functions are much smaller than the amplitude of the center lobe. The Bar-David '110 reference describes a method and apparatus for compensating for this type of interference. The eight delay positions are selected so that the center lobes in the correlation functions of consecutive Barker sequences can never overlap.

The present invention improves upon the above-described code position modulation technique by increasing the symbol rate without increasing the chip timing. To accomplish this, variable rate symbol generator 202 modifies the symbol interval so that a new symbol (i.e., a new 11-chip Barker sequence) is generated in each channel, on average, once every nine chips. This results in an overlap of, on average, two chips in each channel (even without code position modulation). The "average" symbol rate and the "average" overlap are described because time shifting the Barker sequences (when code position modulation occurs) continually varies the separation between the starts of consecutive Barker sequences and the amount of overlap, as well.

After the preamble, variable rate symbol generator 202 increases the symbol rate during transmission of the data field. As will be shown below, the Barker sequences may overlap in each channel by as much as two chip positions without allowing the center lobes in the correlation functions to overlap. This reduces the symbol interval to 9/11 of the previous symbol interval. This is equivalent to increasing the information bit transmission rate by 11/9. In the above-described example, quadrature encoding and code position modulation achieved a transmission rate of 8 MHZ for the baseband information bit, using a 1 MHZ symbol rate. The present invention increases the symbol rate while maintaining the chip rate (11 MHZ) and the duration of each Barker sequence (1 microsecond), resulting in an information bit transmission rate of (11/9×8 MHZ)=9.77 MHZ.

For the purpose of simplicity in further describing the invention, FIGS. 3–6 depict the correlator output functions for only one of the two channels of a quadrature signal. Also, for the purpose of simplicity, the Barker sequences which cause the spike waveforms in FIGS. 3–6 all represent the same binary value (e.g., logic "0"), so that the corresponding correlator functions all have center lobe peaks having the same sign (i.e., positive amplitudes).

Below each correlator output function in FIGS. 3–6, a series of nine time slots or eleven time slots is shown, depending on the symbol rate used. These time slots correspond to chip positions in the received symbols. Also shown below the correlator output functions in FIGS. 3–6 are Barker sequences 1–3 that show the relative spacing in the transmitter of the symbols that cause the correlator output functions. However, it should be understood that no absolute timing relationship is intended to be shown between the Barker sequences in the transmitter and the resulting correlator output functions. In fact, the center lobe spikes in the correlator output functions will not occur until after the end of each Barker sequence, as a result of signal processing delays in each received signal path and due to the fact that the entire chip sequence must be received and fed into in-phase correlator 266 or quadrature correlator 268 before the center lobe spike occurs. Barker sequences 1–3 are shown for the purpose of showing changes in the relative spacing between consecutive correlator output spike waveforms as a result of changes in the relative spacing of consecutive Barker sequences in the transmitter.

Additionally, the small sidelobes shown in the correlator output functions in FIGS. 3–6 are for reference only. The size, shape and spacing of the sidelobes are not intended to be to scale. The sidelobes are shown merely to convey that the correlator generally has a some small output value close to zero. The correlator output functions in FIGS. 3–6 are "ideal" waveforms for a perfectly received codeword. In an actual receiver operating in a realistic channel environment, multipath fading, delay spread, noise, intersymbol interference, and the like, will tend to distort the sizes and shapes of both the large center lobe spikes and the smaller sidelobes.

Figure 3:
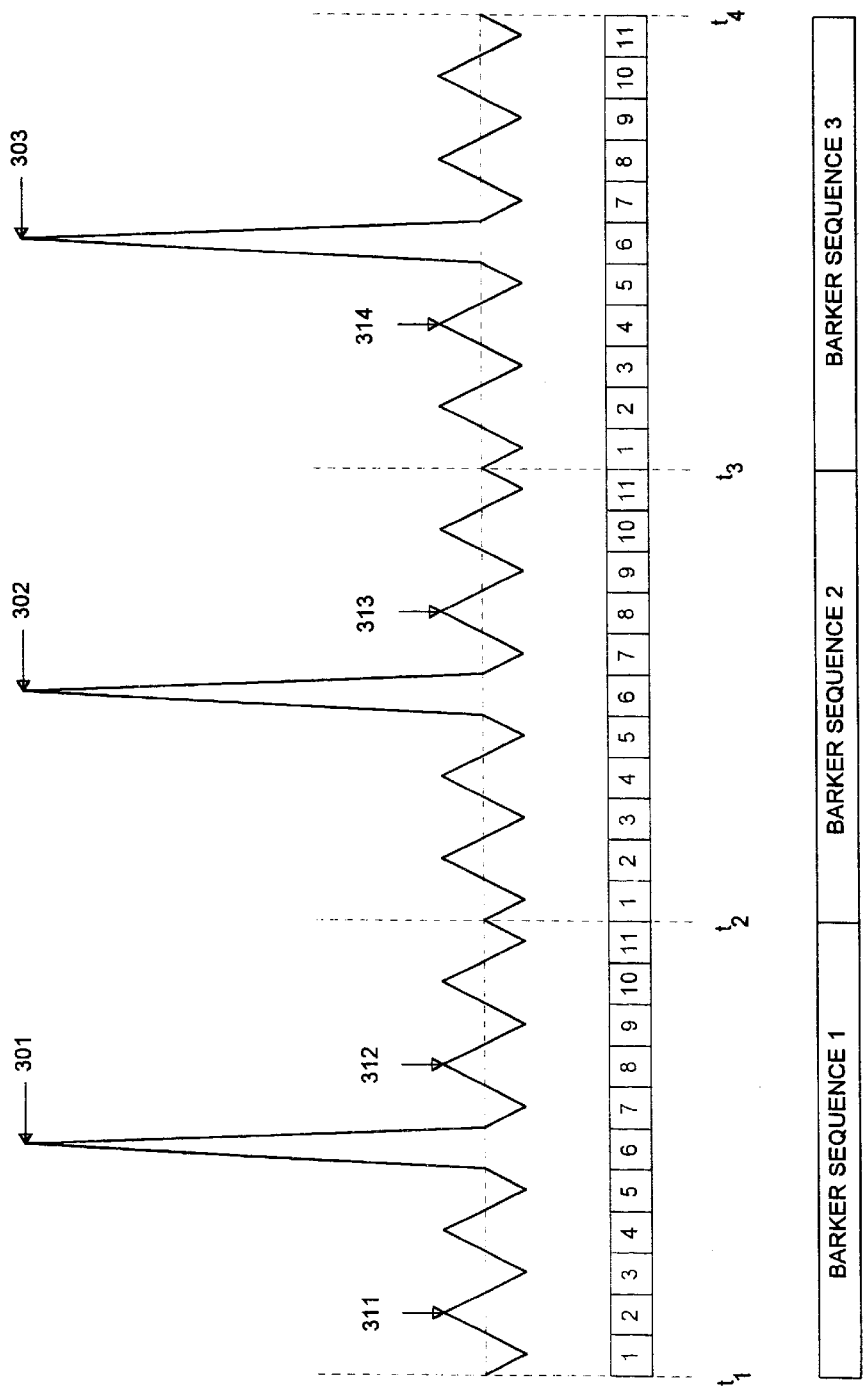
FIG. 3 illustrates a timing diagram which depicts an exemplary correlator output for an eleven chip Barker code sequence.

FIG. 3 illustrates timing diagram 300, which depicts an exemplary correlator output for an eleven chip Barker code sequence. At the end of the synchronization field, receiver 250 is synchronized to transmitter 200 and generates the fixed reference timing windows (shown as dotted lines) delineated by $t_1$, $t_2$, $t_3$, and $t_4$. In FIG. 3, code position modulation is not used, so that Barker sequences 1–3 are transmitted consecutively, with no overlap. The resulting correlator functions therefore have center lobes 301–303 that coincide with chip position 6 within each fixed reference window. As previously stated, the side lobes 311–314 of the correlator functions are much smaller than the center lobes 301–303. The correlator function shown corresponds to a 1 MHZ information bit transmission rate (2 MHZ if the other quadrature channel is simultaneously used), wherein a single 11-chip Barker sequence representing one binary information bit (e.g., logic "0") is transmitted every 1 microsecond.

Figure 4:
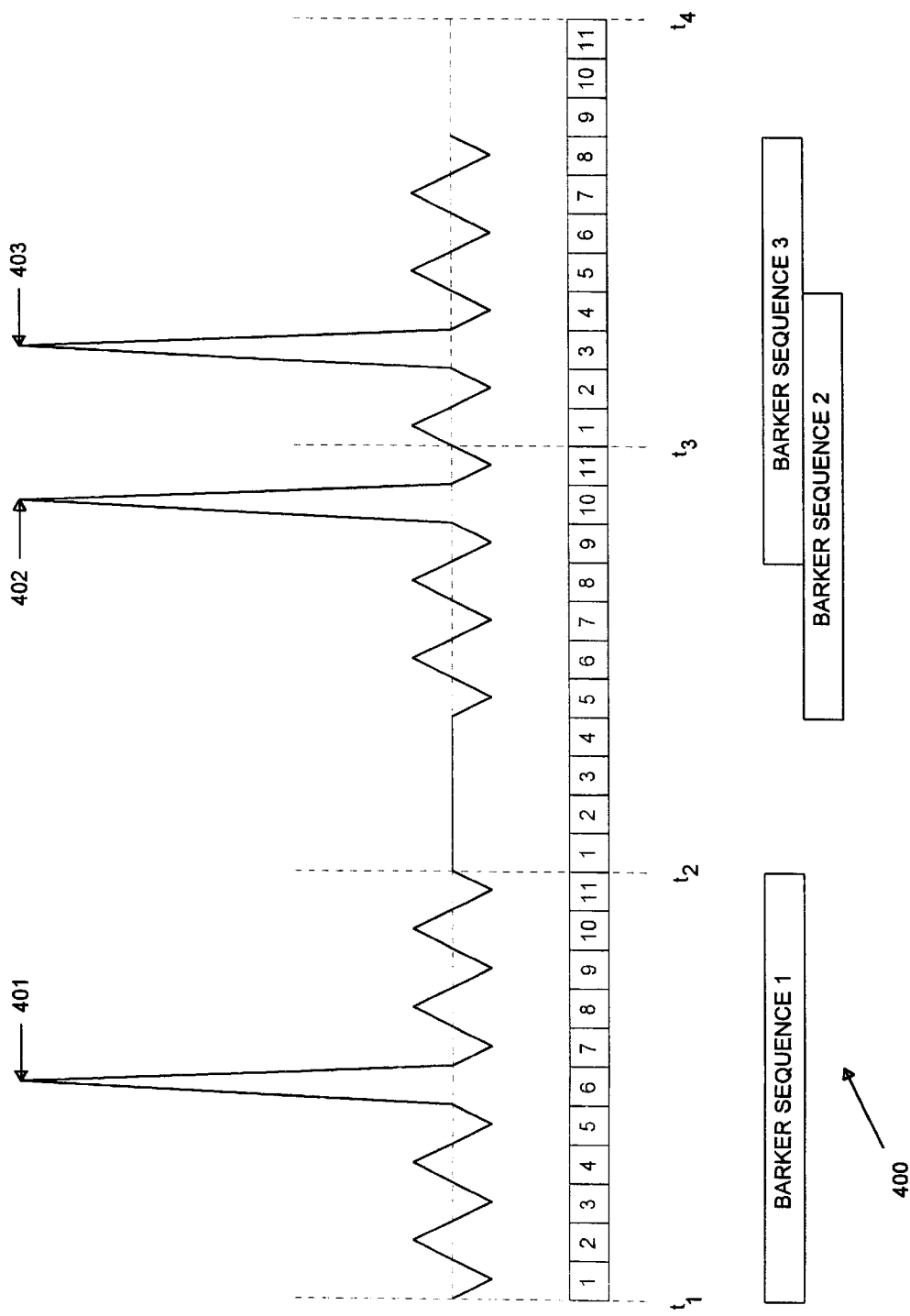
FIG. 4 illustrates a timing diagram which depicts an exemplary correlator output for a code position modulated eleven chip Barker code sequence.

FIG. 4 illustrates timing diagram 400, which depicts an exemplary correlator output for a code position modulated eleven chip Barker code sequence. Three additional bits are encoded (per quadrature channel) by delaying or advancing the transmitted Barker sequences through one of eight possible positions. In the example shown, the eight possible positions correspond to chip positions 3–10 in each fixed reference window.

The three delay bits used for Barker sequence 1 correspond to chip position 6, so that the correlator function for Barker sequence 1 is neither advanced nor delayed from its normal position within the fixed reference window. The three delay bits used for Barker sequence 2 correspond to chip position 10, so that the correlator function for Barker sequence 2 is delayed by four chip positions from its normal position at chip 6. The three delay bits used for Barker sequence 3 correspond to chip position 3, so that tehe correlator function for Barker sequence 3 is advanced by three chip positions from its normal position at chip 6. In the example shown, center lobes 402 and 403, which are caused by Barker sequence 2 and Barker sequence 3, are as close as possible. Nonetheless, a minimum of thre e chip positions remain between center lobes 402 and 403. As timing diagram 400 illustrates, eight binary values between 000 and 111 may be encoded by shifting the position of the center lobe of each Barker sequence between chip positions 3 through 10.

Figure 5:
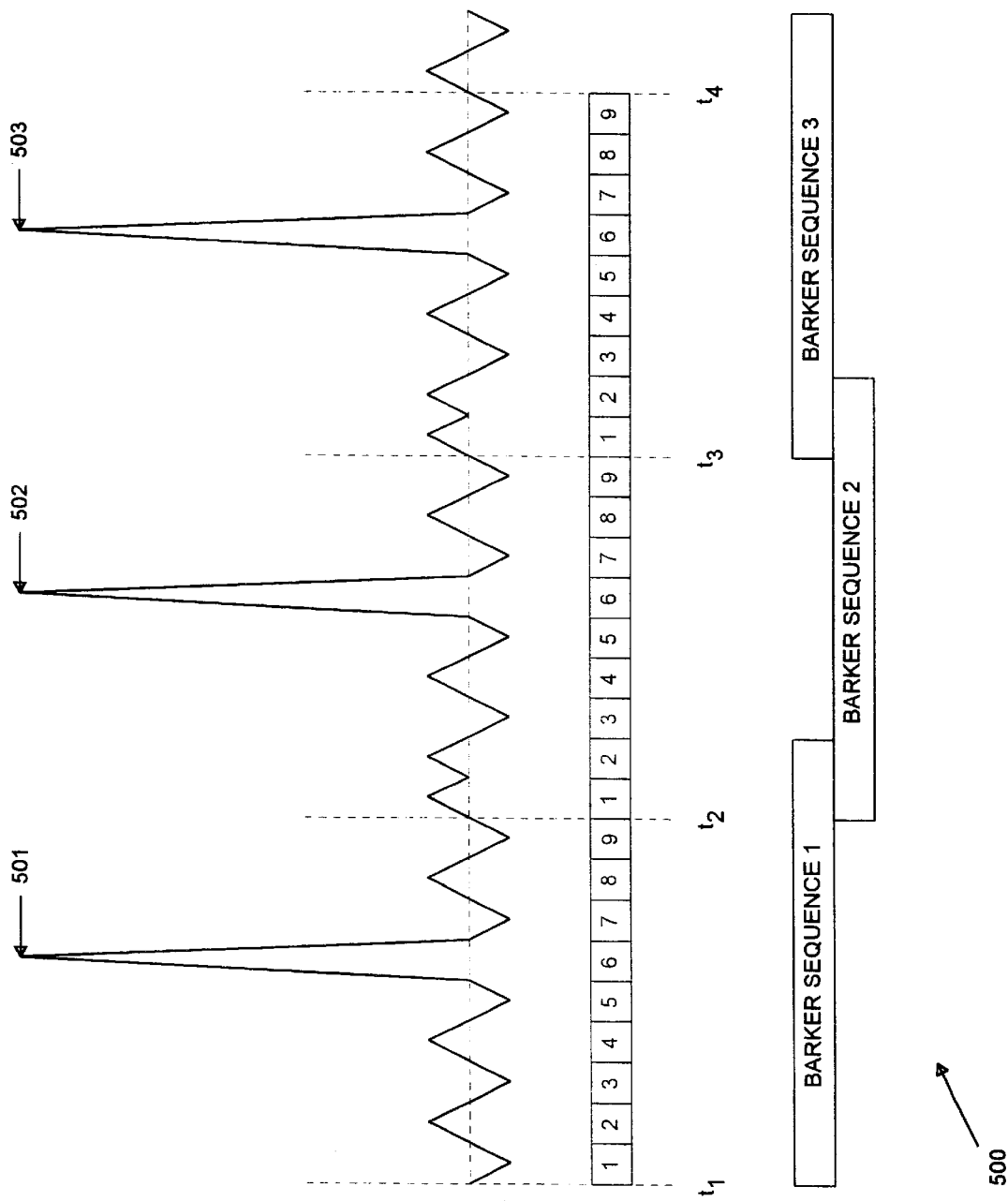
FIG. 5 illustrates a timing diagram which depicts an exemplary correlator output for an eleven chip Barker code sequence, wherein the symbol rate is increased according to one embodiment of the present invention.

FIG. 5 illustrates timing diagram 500, which depicts an exemplary correlator output for an eleven chip Barker code sequence, wherein the symbol rate is increased according to one embodiment of the present invention. In FIG. 5, code position modulation is not used, so that Barker sequences 1–3 are transmitted consecutively. Unlike FIG. 3, however, overlap still occurs between consecutive Barker sequences because a new symbol is generated every nine chip positions, whereas the Barker sequences are eleven chips long. The resulting correlator functions have center lobes 501–503 that coincide with chip position 6 within each fixed reference time frame. The side lobes of the correlator functions, which are much smaller than the center lobes 501–503, will overlap in the first two and the last two chip positions of each Barker sequence. Even without code position modulation, the increased symbol rate increases the transmitted bit information rate by 11/9, so that the effective data rate for one channel is (11/9×1 MHZ)=1.22 MHZ.

Figure 6:
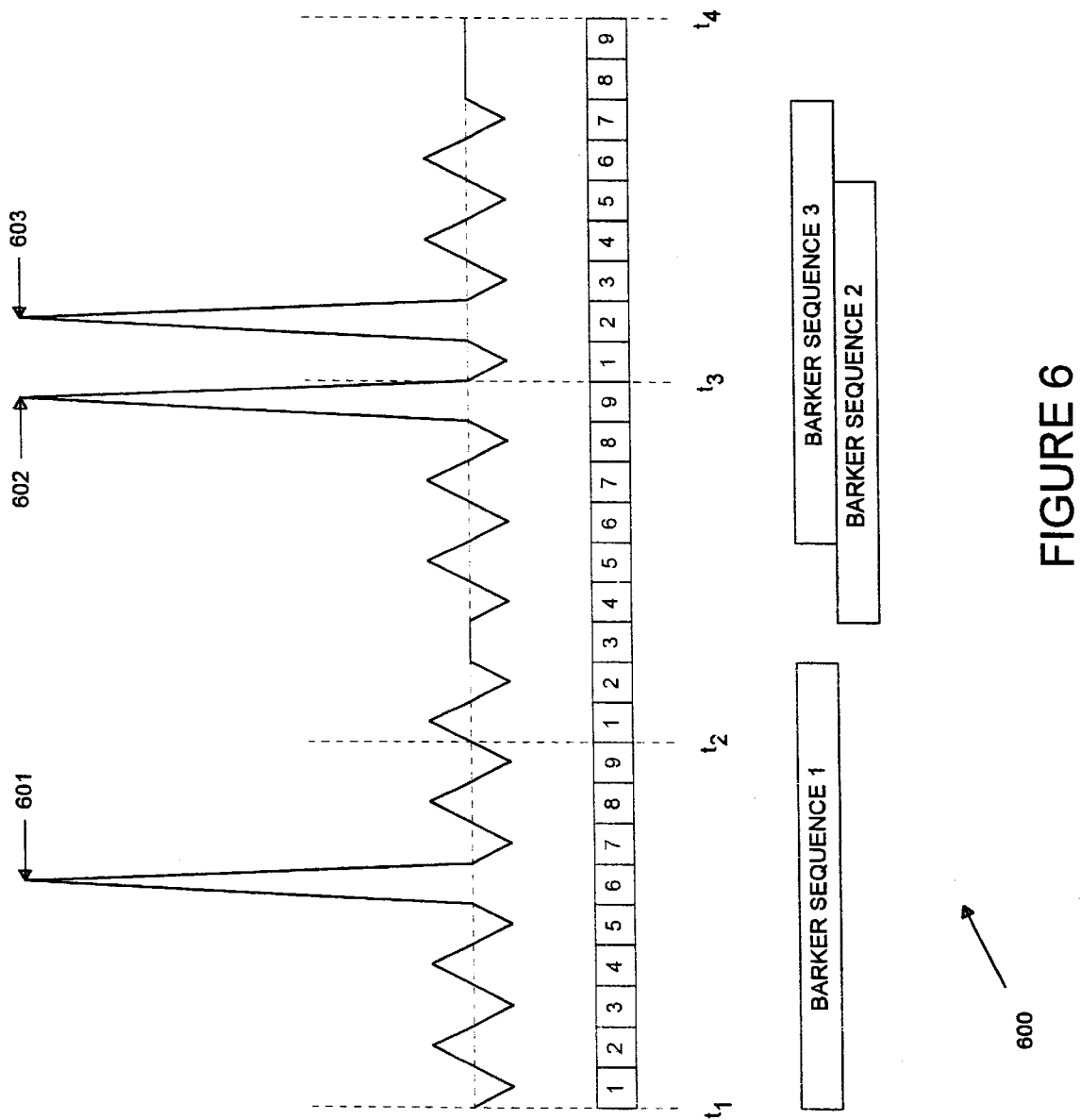
FIG. 6 illustrates a timing diagram which depicts an exemplary correlator output for a code position modulated eleven chip Barker code sequence, wherein the symbol rate is increased according to one embodiment of the present invention.

FIG. 6 illustrates timing diagram 600, which depicts an exemplary correlator output for a code position modulated eleven chip Barker code sequence, wherein the symbol rate is increased according to one embodiment of the present invention. Three additional bits are encoded by delaying or advancing the transmitted Barker sequences through one of eight possible positions. In the example shown, the eight possible positions correspond to chip positions 2–9 in the Barker sequence.

The three delay bits used for Barker sequence 1 correspond to chip position 6, so that the correlator function for Barker sequence 1 is neither advanced nor delayed from its normal position within the fixed reference window. The three delay bits used for Barker sequence 2 correspond to chip position 9, so that the correlator function for Barker sequence 2 is delayed by three chip positions from its normal position at chip 6. The three delay bits used for Barker sequence 3 correspond to chip position 2, so that the correlator function for Barker sequence 3 is advanced by four chip positions from its normal position at chip 6. In the example shown, center lobes 602 and 603 of Barker sequence 2 and Barker sequence 3 are as close as possible. In this case, one chip position remains between center lobes 602 and 603. As timing diagram 600 illustrates, eight binary values between 000 and 111 may be encoded by shifting the position of the center lobe of each Barker sequence between chip positions 2 through 9.

It will be apparent to those skilled in the art that the improved transmitters and receivers described above are not limited to systems that conform to the IEEE 802.11 standard, nor are they limited to systems employing 11-chip Barker sequences. The present invention may be readily adapted for use with other spread spectrum standards and with different types of pseudorandom noise codes, such as Kasami codes, Gold codes, etc., that may also be shorter or longer than eleven chips. Furthermore, the delay values, transmission rates, pulse timing positions and symbol durations described above are merely exemplary values and other values may readily be used. For example, longer chip sequences having at least sixteen (16) timing positions in the fixed reference time frame allow four bits, rather than three bits, to be transmitted in each channel by time shifting the transmitted codeword sequences. Lastly, the present invention is not limited to wireless LANs, but is applicable to a wide variety of communication systems, including cellular telephones and the like.

Although the present invention has been described in detail, those skilled in the art should understand that they can make various changes, substitutions and alterations herein without departing from the spirit and scope of the invention in its broadest form.

What is claimed is:

1. A system for generating a spread spectrum code position modulated waveform, comprising:
   a spread-spectrum encoder that receives and encodes portions of an information signal with a multi-chip code having a predetermined length to create therefrom a stream of sequences, each of said sequences having said predetermined length; and
   a transmitter that periodically transmits said each of said sequences at a time interval that is less than said predetermined length, a data rate of transmission of said information signal thereby allowed to increase.

2. The system as recited in claim 1 wherein said information signal is digital, said portions corresponding to individual bits of said information signal.

3. The system as recited in claim 1 wherein said multi-chip code is a Barker code.

4. The system as recited in claim 1 wherein said predetermined length is less than 20 chips.

5. The system as recited in claim 1 wherein said stream of sequences is processed to create main lobes therein, said time interval being one chip greater than an allowable range of chip offsets applied to said main lobes.

6. The system as recited in claim 1 wherein said time interval is 9 chips.

7. A method of generating a spread spectrum code position modulated waveform, comprising the steps of:
   spread-spectrum encoding portions of an information signal with a multi-chip code having a predetermined length to create therefrom a stream of sequences, each of said sequences having said predetermined length; and
   periodically transmitting said each of said sequences at a time interval that is less than said predetermined length, a data rate of transmission of said information signal thereby allowed to increase.

8. The method as recited in claim 7 wherein said information signal is digital, said step of spread-spectrum encoding comprising the step of spread-spectrum encoding individual bits of said information signal.

9. The method as recited in claim 7 wherein said step of spread-spectrum encoding comprises the step of spread-spectrum encoding said portions of said information signal with a Barker code.

10. The method as recited in claim 7 wherein said predetermined length is less than 20 chips.

11. The method as recited in claim 7 further comprising the step of processing said stream of sequences to create main lobes therein, said time interval being one chip greater than an allowable range of chip offsets applied to said main lobes.

12. The method as recited in claim 7 wherein said time interval is 9 chips.

13. A wireless local area network (LAN), comprising:
   a plurality of computers, each of said plurality of computers having a processor, memory and wireless data communication circuitry, said wireless communication circuitry allowing transmission and reception of digital data among said plurality of computers and including a system for generating a spread spectrum code position modulated waveform to be transmitted by said wireless communication circuitry, said system including:
      a spread-spectrum encoder that receives and encodes said digital data with a multi-chip code having a predetermined length to create therefrom a stream of sequences, each of said sequences having said predetermined length, and
      a transmitter that periodically transmits said each of said sequences at a time interval that is less than said predetermined length, a rate of transmission of said digital data thereby allowed to increase.

14. The LAN as recited in claim 13 wherein said multi-chip code is a Barker code.

15. The LAN as recited in claim 13 wherein said predetermined length is less than 20 chips.

16. The LAN as recited in claim 13 wherein said stream of sequences is processed to create main lobes therein, said time interval being one chip greater than an allowable range of chip offsets applied to said main lobes.

17. The LAN as recited in claim 13 wherein said time interval is 9 chips.

* * * * *